United States Patent [19]
Coffman

[11] B 3,990,299
[45] Nov. 9, 1976

[54] COMBINED WATER METER AND PRESSURE REGULATOR

[75] Inventor: Rudleigh G. Coffman, El Cerrito, Calif.

[73] Assignee: Kaiser Aerospace and Electronics Corporation, Oakland, Calif.

[22] Filed: Apr. 4, 1975

[21] Appl. No.: 565,275

[44] Published under the second Trial Voluntary Protest Program on April 6, 1976 as document No. B 565,275.

Related U.S. Application Data

[63] Continuation-in-part of Ser. No. 468,410, May 9, 1974, abandoned.

[52] U.S. Cl. .............................. 73/199; 137/493.8; 137/505.44; 137/550
[51] Int. Cl.² ...................... G01F 1/06; F16K 31/12
[58] Field of Search ...... 73/199; 137/493.8, 505.44, 137/505.45, 550, 560

[56] References Cited
UNITED STATES PATENTS

| | | | |
|---|---|---|---|
| 868,599 | 10/1907 | Coleman | 137/505.44 |
| 2,274,697 | 3/1942 | Hutchinson et al. | 73/199 |
| 3,115,154 | 12/1963 | Dillon | 137/493.8 |
| 3,377,856 | 4/1968 | Hasegawa | 73/199 |

*Primary Examiner*—Richard C. Queisser
*Assistant Examiner*—John P. Beauchamp
*Attorney, Agent, or Firm*—Naylor, Neal & Uilkema

[57] ABSTRACT

A fluid impervious housing having an upper cavity for a water meter and a lower cavity for pressure regulating apparatus. A removable partition separates the cavities and removal of the partition provides access to both cavities for maintenance. The pressure regulator includes a reciprocable valve and the partition has a guide for such valve so that when the partition is removed the valve is accessible. The lower cavity is arranged to accommodate a valve structure employing Bellofram seals. A back pass check valve for affording reverse flow should the output pressure exceed the input pressure. A pressure relief valve for releasing water to the exterior of the apparatus should pressure downstream of the apparatus reach an excessive level. A screen for preventing entry of solid particulates into the relatively delicate meter mechanism in the upper chamber.

14 Claims, 10 Drawing Figures

3,990,299

COMBINED WATER METER AND PRESSURE REGULATOR

CROSS-REFERENCE TO RELATED APPLICATION

This is a Continuation-in-Part of U.S. application for patent Ser. No. 468,410, filed May 9, 1974, now abandoned.

BACKGROUND OF THE INVENTION

This invention relates to a combined water meter and pressure regulator and, more particularly, to a water meter and regulator that can be used to replace existing water meters without significant modifications in the piping to and from the existing water meter. The invention promotes water conservation by providing for water pressure reduction in an economical manner.

DESCRIPTION OF THE PRIOR ART

The known prior art includes many forms of water meters as individual units and many forms of water pressure regulators as individual units. The known art also includes systems wherein water meters and water pressure regulators are connected in the same system by means of pipes and plumbing fittings.

Combination gas meters and gas pressure regulators are disclosed in such U.S. Pat. Nos. 2,274,697; 2,839,923; and, 3,433,067. U.S. Pat. No. 2,813,542 discloses a gas pressure regulator adapted for installation on a conventional gas meter and U.S. Pat. No. 2,867,234 discloses a gas pressure regulator which incorporates a relief valve.

SUMMARY OF THE INVENTION

According to the present invention, there is a housing which contains both a water meter and a pressure regulator. The regulator and meter are stacked vertically in the housing so that the overall diameter of the housing is equivalent to that of existing water meters. Thus, a combination meter and regulator of the present invention can be substituted for an existing water meter without modification of piping so as to achieve a substantial reduction in water consumption for the typical residential user.

A study of residential water consumption in one locality has indicated that, when water is supplied at 100 psi, the average per capita consumption is 110 gallons per day. Such study has also shown that, when the pressure is reduced from 100 psi to 50 psi, there is a daily per capita saving of approximaterly 14 gallons per day for a saving of 12.7% in that volume used for irrigation. From the study, it is indicated that the cost of adding a pressure regulator to an existing water system, at the present time, may range from about $85 to over $200. By way of contrast, a combined meter and pressure regulator according to the invention can be installed for about $30 and such installation can take place solely at the meter location and without disturbing the piping within a house.

It is an object of the present invention to provide a combination water meter and regulator that can be installed with minimum disturbance of existing piping. This object is achieved by the housing provided by the present invention because the housing provides for vertically stacked cavities for the water meter and pressure regulator so that the overall diameter of the housing is identical to the diameter of the meter housing that it replaces. Thus, it is a simple matter for unskilled laborers to remove the unions that connect the existing water meter and to substitute for the existing water meter a combined meter and pressure regulator of the present invention.

Another object is to provide a combined water meter and pressure regulator that can employ existing water meter movements. This object is achieved by the housing of the present invention because the upper portion of the housing defines a cavity to receive a conventional water meter movement therein. Accordingly, water companies and their subscribers can obtain the benefits of the present invention without substantial capital expenditures.

Another object of the present invention is to provide a combined water meter and pressure regulator that is arranged to expedite assembly and maintenance. This object is achieved according to the present invention by providing a housing having an upper cavity for a water meter movement and a lower cavity for a pressure regulator, which cavities are separated by a removable partition. Because the partition is removable, access to the interior of both cavities is readily achieved.

Yet another object of the present invention is to provide a combined water meter and pressure regulator that has safety devices for protecting both the meter/regulator apparatus and the house piping from overpressure. The invention includes a back pass check valve so that water in the house piping, if it reaches a dangerously high pressure, can be passed back to the water supply piping until the high pressure is relieved. The invention also includes a pressure relief valve so that water in the house piping system at high pressure, such as might occur because of a defective hot water heater, can be relieved to the atmosphere in which the meter resides. These safety elements are self-contained so as not to interfere with installation of the improved meter/regulator.

Still another object of the present invention is to provide a housing which can accommodate a valve supported by Bellofram seals, such seals being a known expedient for affording smooth valve operation. This object is achieved according to the present invention because the lower cavity is arranged to be accessible from both the upper and lower extremities of such cavity.

The foregoing, together with other objects, features and advantages, will be more apparent after referring to the following specification and accompanying drawings.

DESCRIPTION OF THE PREFERRED EMBODIMENTS

Figure 1:
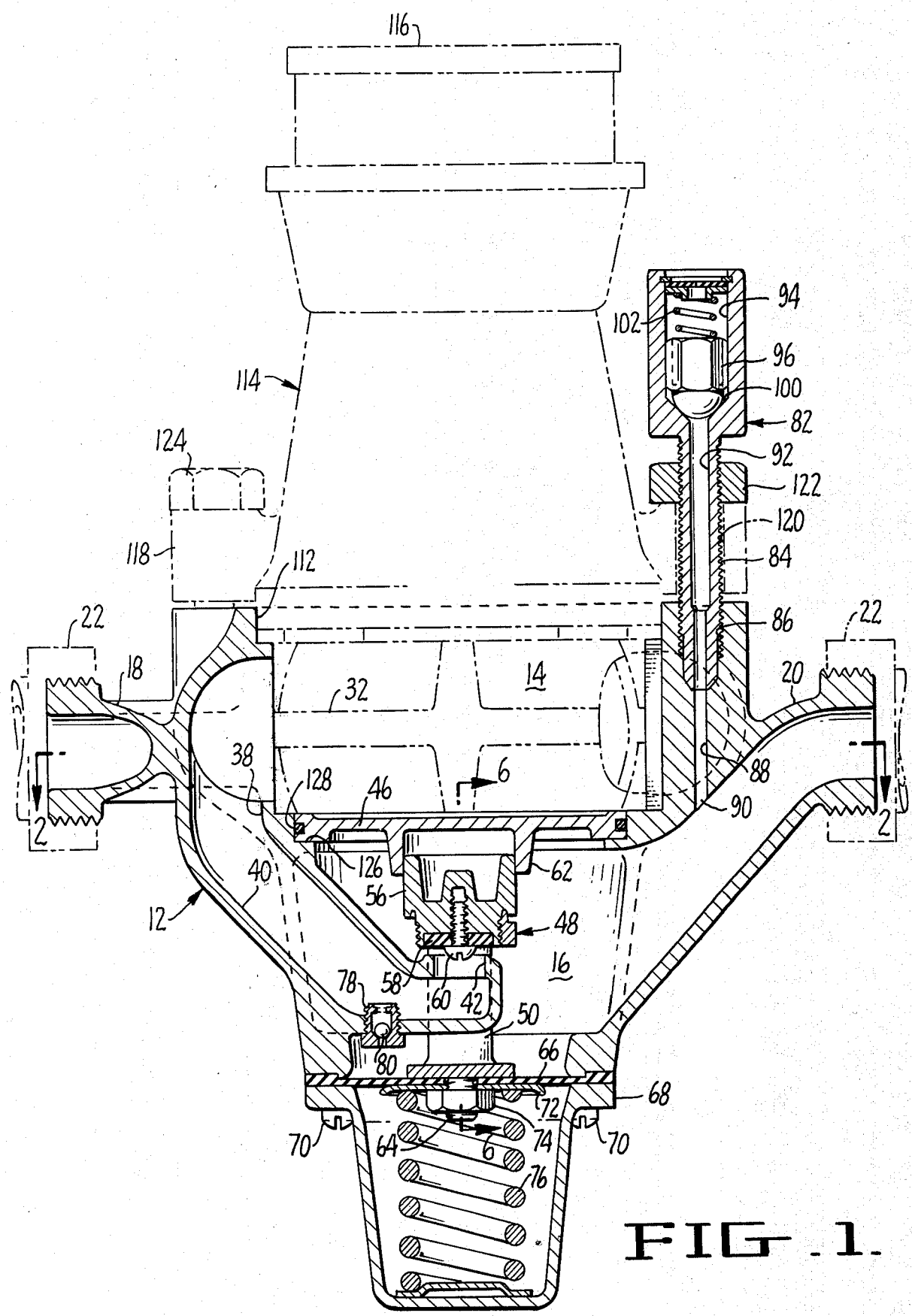
FIG. 1 is an elevational view in cross-section of a combined water meter and water pressure regulator according to the invention taken generally along line 1—1 of FIG. 2.

Referring more particularly to the drawings, reference numeral 12 indicates a fluid impervious housing for a combined water meter and pressure regulator of the present invention. Housing 12 defines an upper cavity 14 and a lower cavity 16 which is in vertical alignment below the cavity 14. Housing 12 includes an input fitting 18 and a diametrically opposed output fitting 20. As is conventional with water meter housings, such fittings are engaged by unions 22 which constitute parts of the piping that delivers water from the main to the premises of the customers. Housing 12 is provided interiorly thereof with means for communicating water that enters input fitting 18 to output fitting 20 through cavities 12 and 14. In the embodiment shown in FIGS. 1–3, the water is first communicated through upper metering cavity 14 and thence to lower pressure regulating cavity 16 and then to output fitting 20.

Figure 2:
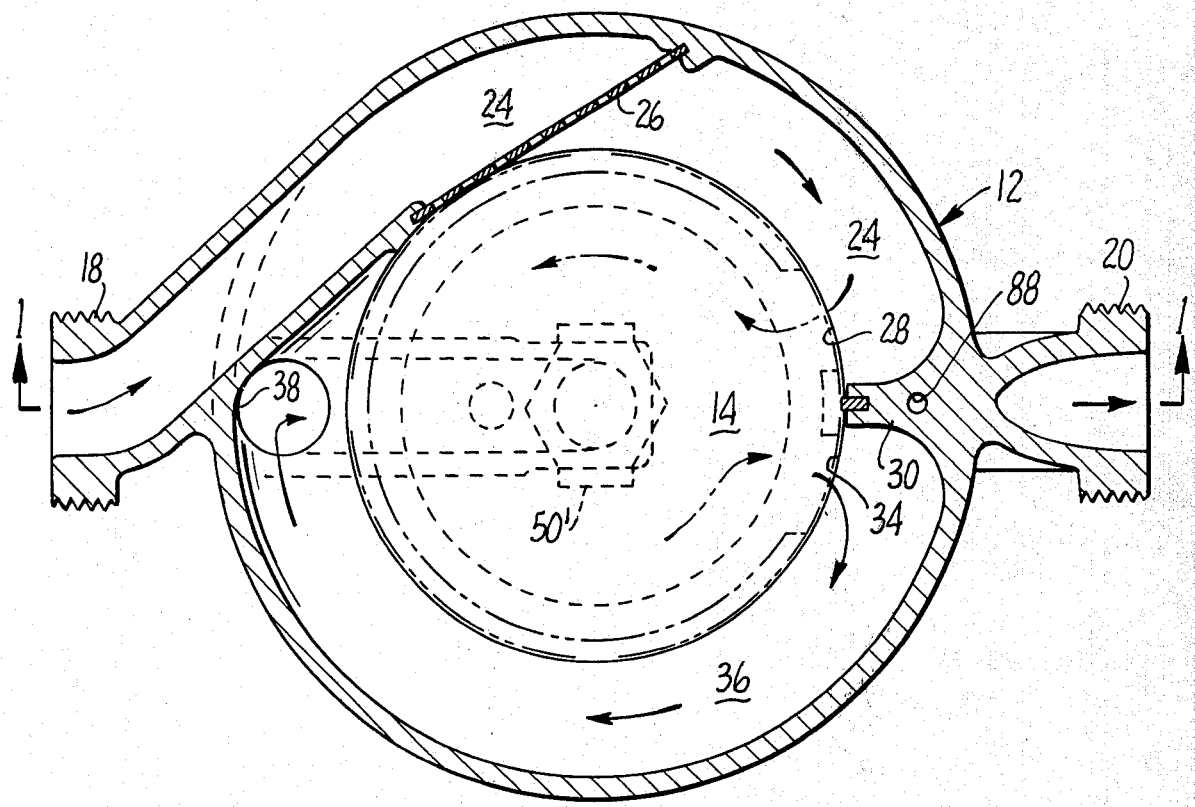
FIG. 2 is a cross-sectional plan view taken generally along line 2—2 of FIG. 1.

As seen most clearly in FIG. 2, water entering input fitting 18 is directed in a tangential path 24 through a perforated plate or gravel screen 26 to a port 28 which is approximately diametrically opposite from the input fitting. As indicated by the arrow, port 28 communicates the water into upper meter cavity 14. Housing 12 includes a wall 30 that extends radially inward to define the circumferential extremity of path 24. Within chamber 19 is the flow sensitive element or metering chamber of a conventional water meter movement, such element being shown schematically in FIG. 1 at 32 and comprising a nutating or rotating vane structure. On the opposite side of wall 30 from port 28 is a discharge port 34 through which the water flows after it has been metered by vane structure 32. The water is then conveyed along a circular path 36 back to the region adjacent to and inward of input fitting 18, at which region there is an outlet port 38 which conducts the water out of upper cavity 14.

Figure 7:
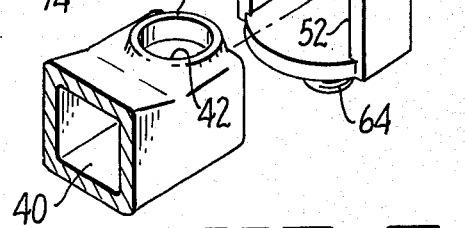
FIG. 7 is an exploded view of the elements of FIG. 6.

From outlet port 38, as seen most clearly in FIG. 1, water is conveyed through a conduit 40 which slopes downward and inward to cavity 16. At the lower end thereof, conduit 40 defines an inlet opening 42 for permitting flow of the water into cavity 16. The margin of conduit 40 surrounding inlet opening 42 is indicated at 44 in FIG. 7 and constitutes a valve seat. Valve seat 44 in the embodiment shown in the drawings is in a horizontal plane. A partition 46 separates upper cavity 14 from lower cavity 16 and lies in a plane parallel to the valve seat 44.

A valve structure, generally indicated at 48, is arranged for movement toward and away from seat 44 in accordance with the pressure existing in cavity 16. Valve structure 48 includes a yoke 50 that defines a central excision 52 (See FIG. 7) of sufficient size to accommodate the inner end of conduit 40 and to permit the upper portion of the yoke to move toward and away from valve seat 44. The upper portion of yoke 50 is interiorly threaded at 54 to engage corresponding threads on a valve body 56. The lower axial end of valve body 56 is counter-bored to receive a resilient disc washer 58, the washer being retained in place by a screw 60 received in a correspondingly threaded hole in valve body 56. When valve body 56 and yoke 50 are moved downward, disc washer 58 seats on valve seat 44 and prevents entry of water into cavity 16 through inlet opening 42. The upper end of valve body 56 is slidably supported in a guide 62 which is formed integral with partition 46. Because partition 46 is removable, access for assembly and maintenance of the valve structure is facilitated. Moreover, guide 62 constrains valve body 56 and therefore the entire valve structure 48 for axial movement relative to the seat 44.

Yoke 50 at the lower end, i.e., the end opposite from threaded portion 54, has an integral threaded stud 64 extending therefrom. A fluid impervious flexible diaphragm 66 has an opening for admitting stud 64 thereto, diaphragm 66 being retained in operative position by peripheral clamping effected when a cap 68 is secured via screws 70 to the lower open end of housing 12. Yoke 50 is fixed to diaphragm 66 by means of a cup washer 72, lying on the lower side of the diaphragm and a nut 74 engaged on stud 64. Thus, yoke 50 and valve body 56 are urged downward by the pressure within cavity 16 acting on diaphragm 66. Valve structure 48 is urged upward by means of a compression spring 76 within cup 68. The characteristics of spring 76 determine the pressure which is maintained within cavity 16 by the water pressure regulating means of the present invention. Thus, the pressure of the water at output fitting 20, which is the same as the pressure in the house piping system, will be regulated at some pressure below that in the mains, thereby achieving the water conservation referred to hereinabove.

In the typical operating environment, the pressure in cavity 16 will be less than the pressure within conduit 40. In such situation, a back pass check valve 78 which is threadly engaged in the wall of conduit 40 is closed because the ball 80 is seated so as to inhibit flow through the valve. Should the pressure within cavity 16 increase above that of the pressure present within conduit 40, however, water is permitted to flow through valve 78 from cavity 16 into the conduit. High pressure within cavity 16 can occur should there be any adverse circumstance in the house piping fed by the water meter and pressure regulator of the present invention. For example, if a hot water heater downstream of the meter/regulator malfunctions, it is likely that the pressure within cavity 16 will reach a level in excess of that in conduit 40.

Figure 8:
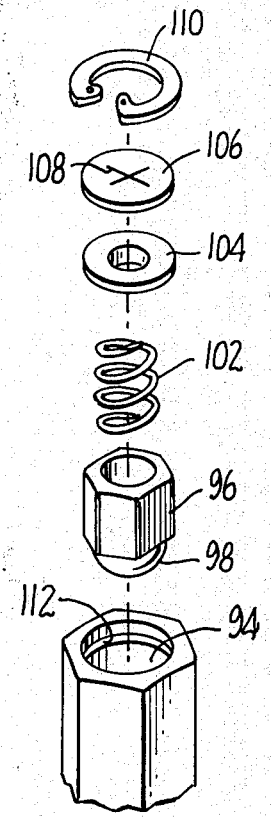
FIG. 8 is an exploded view of a pressure relief valve constituting a part of the present invention.

Another protective device present in the meter/regulator of the present invention is a pressure relief valve generally indicated at 82. Pressure relief valve 82 functions to open at a pre-selected excessive pressure existent in output fitting 20 so as to discharge water until the pressure reaches a safe level. Valve 82 includes an elongate body 84 that is threaded for engagement in a hole 86 formed in body 12. Hole 86 is threaded so as to receive body 84 and retain the same therein. In axial alignment with the bottom of hole 86 is a passage 88 which terminates in an orifice 90 adjacent output fitting 20. Body 84 is centrally bored at 92 and has an upper chamber 94 which is in communication with the interior of outlet fitting 20 through passage 88 and bore 92. Chamber 94 contains a valve for opening bore 92 only when the pressure of the water in the passage exceeds a pre-selected level. The parts of such valve are shown in FIG. 8. There is a valve body 96 which has a lower hemispherical portion 98 that seats on a conical surface 100 which surface is formed on the inner axial end of chamber 94. Valve body 96 is urged into contact with the conical surface by means of a compression spring 102, the lower end of which bears on the bottom of the bored hole shown on the upper surface of valve body 96 and the upper end of which bears against a washer 104 that has a centrally disposed collar for confining the spring in a coaxial position in chamber 94. A filter disc 106 has an X-shaped slit 108 therein, the slit permitting water to exit from chamber 94 when valve 96 is raised, but preventing sand or dirt from entering the valve. The valve parts enumerated above are retained within chamber 94 by means of a resilient lock ring 110 which engages a groove 112 in the side wall of chamber 94.

The characteristics of spring 102 determine the pressure at which valve body 96 is raised. Spring 102 is typically chosen so that valve body 96 will be raised to permit water flow therethrough when the pressure within the output opening 20 exceeds a preselected pressure. Adjustment means may be provided to adjust the compression on the spring. It will be noted that valve body 96 has an hexagonal shape so as to define passages around the valve body through which the water flows when the valve is lifted from seat 100.

Threaded hole 86 is but one of a plurality of similar holes disposed in the margin surrounding an opening 112 in the top of housing 12, the opening affording access to upper cavity 14. Opening 112 is sized to receive a conventional water meter 114 of which the metering chamber 32 is a part. As in conventional, the upper portion of water meter 114 has a hinged door 116 which, when lifted, reveals one or more dials that indicate the amount of water that has flowed through the meter. Water meter 114 has a plurality of readially protruding mounting lugs 118 which are provided with holes to align with corresponding holes in the margin surrounding opening 112. The hole in one of the mounting lugs 118 is indicated at 120 and is aligned with threaded hole 86. It will be noted in FIG. 1 that body 84 of valve 82 is passed through hole 120 and a nut 122 is engaged with the upper threaded portion of body 84 to retain that portion of the mounting lug 118 to the housing. The holes in the remaining mounting lugs 118 are provided with headed bolts 124, the threaded ends of which are threaded into the openings in the margin housing 12 that surrounds opening 112. It will thus be seen that a conventional water meter 114 can be employed in the present invention, and the water meter can be quickly installed or removed from the housing such as may be necessary for maintenance, inspection and repair.

The partition 46 is aligned with the opening 112 and forms the boundary between upper cavity 14 and lower cavity 16. It will be noted that in the embodiment of FIGS. 1-2, the partition 46 rests on a shoulder 126 interior of housing 12, there being an O-ring 128 for affording a watertight seal between cavities 14 and 16. As is clear from FIG. 1, removal of bolts 124, pressure relief valve 82 and nut 122 permits water meter 114 to be removed. Partition 46 can then be removed through opening 112 so that the parts of pressure regulator valve structure 48 in cavity 16 are accessible for inspection, maintenance and/or repair.

In operation, the water meter/regulator of FIGS. 1-2 can be substituted for an existing conventional water meter because the spacing between input fitting 18 and output fitting 20 is substantially the same as corresponding fittings on a water meter housing. Thus, in the case where the existing water meter is in a sub-surface vault accessible from without a customer's home, the existing water meter can be removed and replaced by a meter/regulator of the present invention without in any way disturbing the house piping. During normal use, water flows through chamber 14 where the flow is metered by water meter 114 and thence through conduit 40 and opening 42 into cavity 16. The cooperation of spring 76 and water pressure on the upper surface of diaphragm 66 moves valve body 56 toward and away from valve seat 44 so that the water in cavity 16, and therefore in output fitting 20, is maintained at a desired value. Should excessive pressure occur in the house piping system, and therefore in output fitting 20, the excessive pressure will be relieved through pressure relief valve 82 and/or through the back pass check valve 78. Thus, the house piping and fixtures connected thereto are not jeopardized and the above-mentioned advantages of lower water pressure are achieved.

Figure 3:
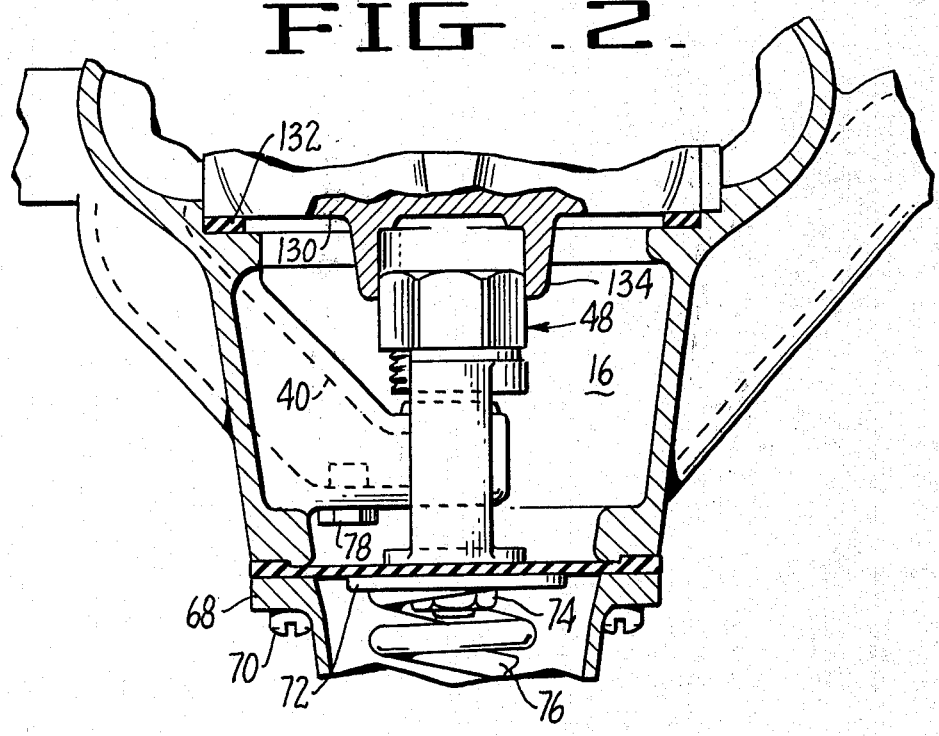
FIG. 3 is a cross-sectional elevational view similar to FIG. 1, showing a modification.

In the modification of FIG. 3, the partition between upper cavity 14 and lower cavity 16 is formed by a fluid impervious wall 130 which is an integral part of metering chamber 32 of the water meter movement disposed in the upper cavity of housing 12. An annular gasket 132 seals the periphery of wall 130 so as to prevent flow between the upper and lower cavities around the edge of the wall. Integral with wall 130 and depending centrally thereof is a guide 134 which is sized to slidably receive valve structure 48. The remainder of FIG. 3 is identical to FIGS. 1 and 2 and will not be further described, it being sufficient to note that removal of metering chamber 32 affords access to cavity 16 and the pressure regulating mechanism therein.

Figure 4:
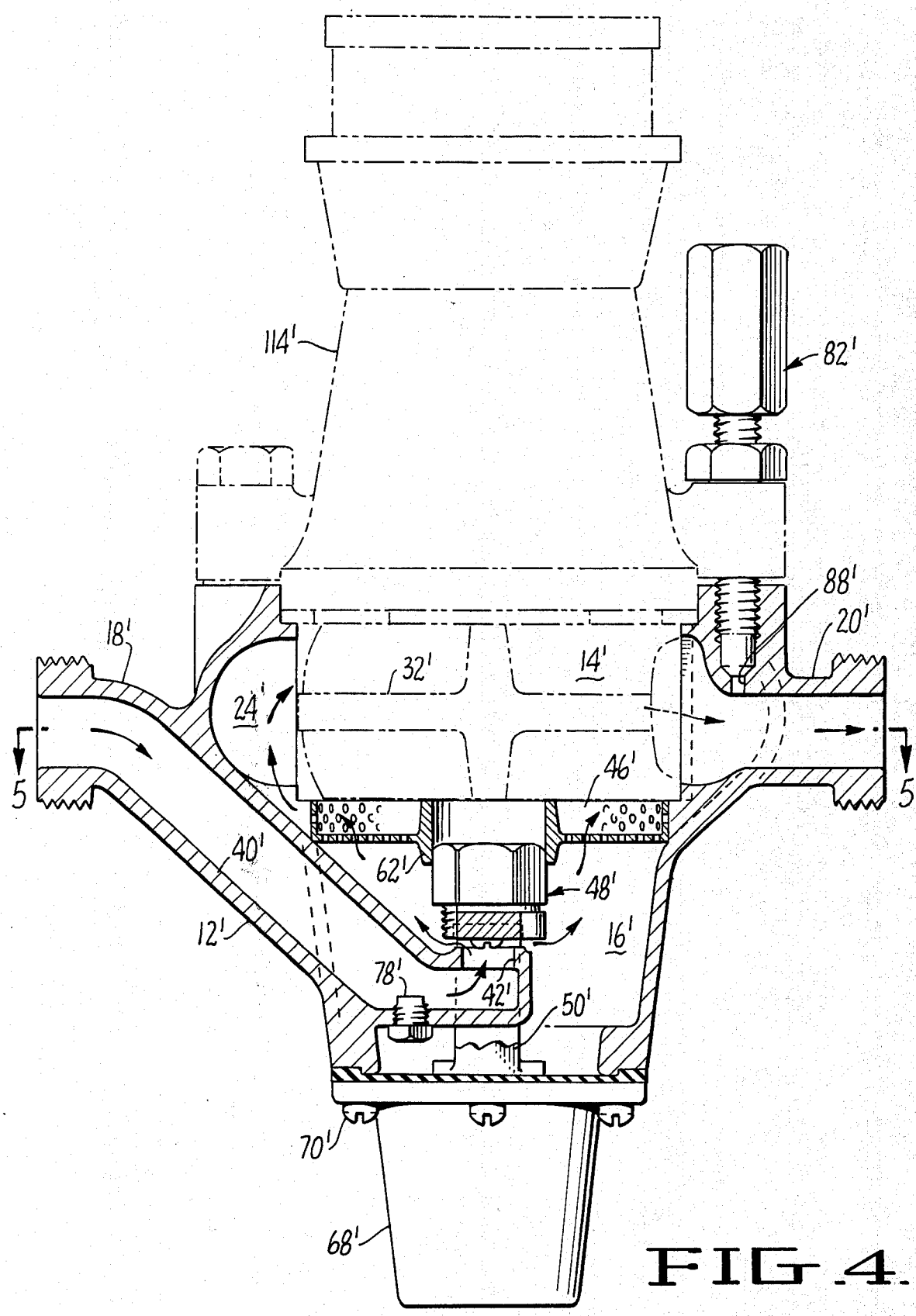
FIG. 4 is a cross-sectional elevational view of an alternate embodiment of the invention taken substantially along line 4—4 of FIG. 5.
Figure 5:
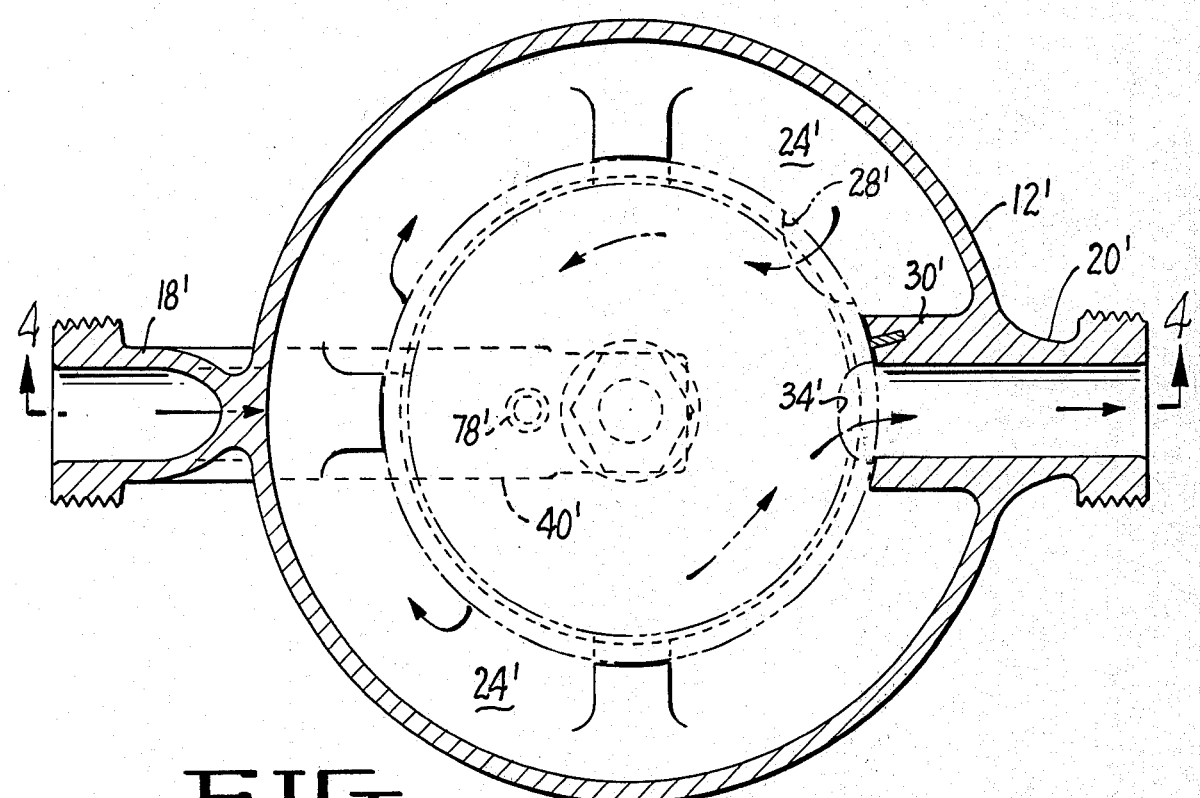
FIG. 5 is a cross-sectional plan view taken along line 5—5 of FIG. 4.
Figure 6:
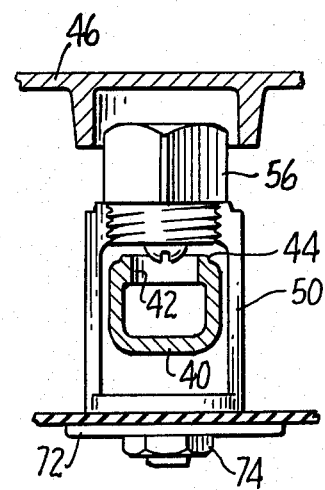
FIG. 6 is a detailed view of the pressure regulator valve and guide therefor constructed according to the present invention, taken along line 6—6 in FIG. 1.

The embodiments of FIGS. 1-3 are arranged so that the metering cavity is upstream of the regulating cavity. The present invention anticipates a structure in which pressure regulation is first achieved and then the metering function is achieved. Such a structure is shown in FIGS. 4 and 5, wherein corresponding reference numerals with the addition of a prime are used to indicate elements that correspond to similarly numbered elements in FIGS. 1-3. With reference to FIGS. 4 and 5, an input fitting 18' communicates directly with a conduit 40', which in turn terminates in a lower cavity 16' in an opening 42'. A valve structure 48' includes a yoke 50' that affords movement of the valve toward and away from opening 42' so that the pressure within cavity 16' is regulated as described above in connection with FIGS. 1-3. There is an upper metering cavity 14' and a partition 46' between cavity 14' and cavity 16'. Partition 46' defines a plurality of openings so that there is a substantial perforated portion therein which permits flow from cavity 16' into cavity 14'. Water passing through the perforations of partition 46' is directed radially outward to a path 24', the water entering water meter chamber 32' via an opening 28'. The water then flows through the metering chamber and exits at port 34' to outlet fitting 20'.

FIG. 4 illustrates that the partition 46' is provided with a depending guide 62' which constrains valve structure 48' for movement toward and away from opening 42'. Moreover, a back pass check valve 78' is provided, as is a pressure relief valve 82'. Water meter 114' is secured to housing 12' in the same manner as described hereinabove in connection with FIGS. 1-3.

The embodiment of FIG. 4 operates by first communicating the water from input fitting 18' directly to cavity 16'. Valve structure 48' in conjunction with opening 42' regulates the pressure within lower cavity 16'. The water then flows through the perforations of partition 46' into path 24' defined at the outer extremity of upper cavity 14'. The water is then conveyed through the water metering chamber structure 32' and thence to output fitting 20'. Consequently, the advantage of the embodiment of FIGS. 1–3 are achieved by the embodiment of FIGS. 4 and 5.

Figure 9:
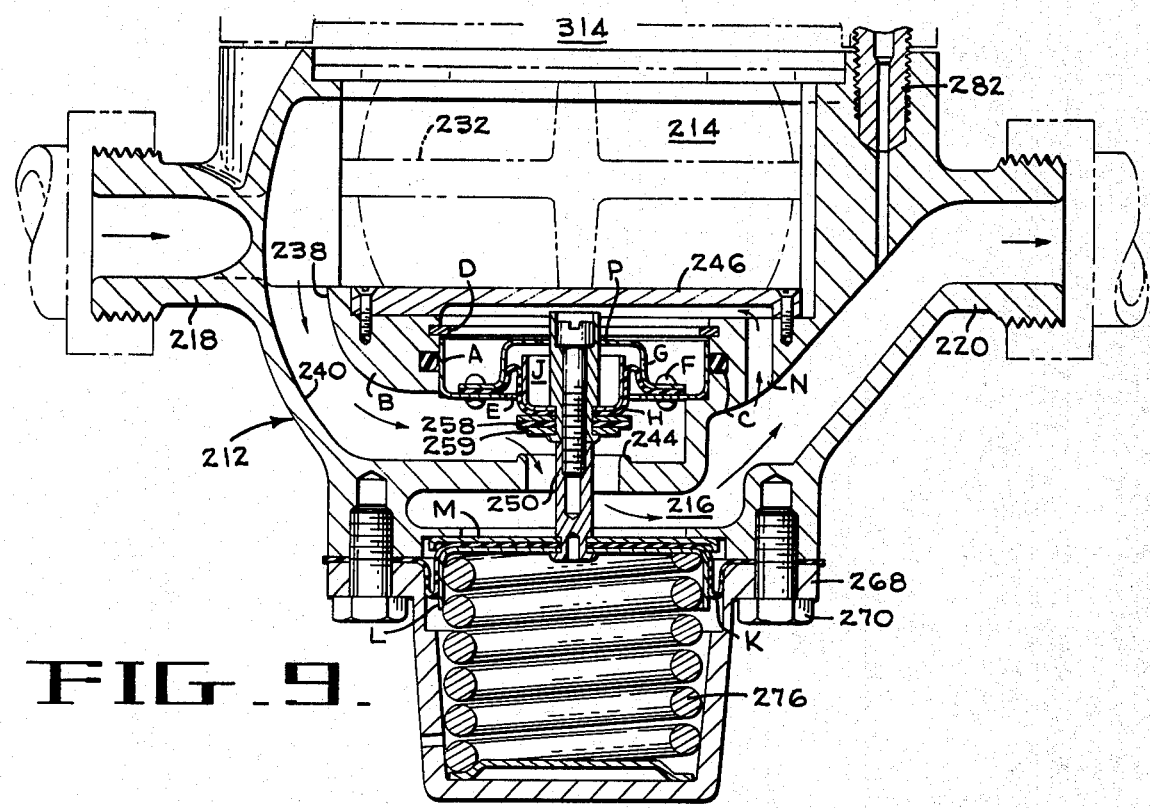
FIG. 9 is a cross-section elevation view of a modified form of the embodiment of FIG. 1.

Because the embodiment of FIG. 9 is similar to the embodiment of FIG. 1, the reference numerals employed in connection with FIG. 9 are greater by 200 than the reference numerals identifying corresponding parts in FIG. 1. There is a housing 212 in which is defined an upper cavity 214 and a lower cavity 216. Water is supplied to the housing through an inlet fitting 218 and exits the housing through a fitting 220. Water entering inlet fitting 218 is directed in a circular path around and through the vane structure 232 which is part of a water meter fragmentarily shown in FIG. 9 at 314. After the water is measured or metered, it passes through a port 238 into a conduit 240 that extends downward and inward toward cavity 216. Disposed within cavity 216 and in communication with conduit 240 is an opening that is circumscribed by a valve seat 244. A disc washer 258 is moved toward and away from the valve seat to regulate the flow through the valve seat which in turn regulates the pressure of the water at outlet opening 220. Disc washer 258 is mounted on a staff 250 and is sandwiched between upper and lower rigid discs or washers 259, the lower one of which has a relatively small diameter to expose the peripheral margin of disc washer 258 for cooperation with seat 244. The opposite ends of staff 250 are supported for reciprocating movement by means of Bellofram seals, the upper one of which includes a rigid cup A the exterior periphery of which is supported in a wall B that forms a part of housing 212, a watertight joint being assured by an O-ring C. A lock ring D retains cup A in place. Cup A defines an opening E rimming which is a plurality of holes for receiving rivets F. Rivets F fix the outer flange of a rigid hat G and the periphery of a flexible diaphragm H to cup A in fixed watertight relationship. Diaphragm H permits staff 250 to reciprocate while maintaining a watertight seal at the upper end of the staff. Rigid with staff 250 and forming part of the Bellofram seal is a piston J which has a cylindric wall portion that supports diaphragm H and maintains it in operative position.

At the lower end of staff 250 is a flexible diaphragm K that is clamped between an annular shoulder on housing 212 and the flange of a cap 268 retained in the housing by means of screws 270. A piston L has a cylindric periphery which supports diaphragm K in an operative position and a circular part that provides a backing for the lower surface of the diaphragm. The upper surface of the diaphragm is supported by a rigid cup M, the upper surface of which is exposed to and acted upon by the water pressure within cavity 216. A compression spring 276 within cap 268 provides a force in opposition to the force caused by water pressure acting on the upper surface of cup M, the force provided by the spring establishing the water pressure at outlet fitting 220.

For affording a pressure differential across the upper Bellofram seal, which aids the force produced by spring 276, there is a port N which communicates the water pressure in cavity 216 to the upper region of the upper Bellofram seal. Hat G defines a central opening P which is sufficiently larger than the diameter of staff 250 to admit water to the interior of piston J but which is sufficiently small to restrict upward water flow through the gap between the staff surface and the opening P in order to form a dashpot or shock absorber to retard the upward movement of the staff at the part secured to it. The pressure on the lower surface of the Bellofram seal is substantially equivalent to the relatively high pressure in the water main; the pressure on the upper surface is substantially equivalent to the relatively low pressure in cavity 216. Accordingly, there is a net upward force on the Bellofram seal which aids the force from spring 276 to produce a greater total upward force without necessitating enlargement of the housing or the spring. Such greater total force permits enlarging of the opening defined by the seat 244 in consequence of which the smoothness of operation of the pressure regulating valve is enhanced.

A partition 246 is removably mounted by means of peripheral screws 247 to isolate cavities 214 and 216 from one another. The partition also assures that the pressure on the upper surface of the Bellofram seal corresponds to the relatively low pressure in cavity 216.

The operation of the embodiment of FIG. 9 is similar to the embodiment of FIG. 1 in that after the water flow in upper cavity 214 is recorded by meter 314, the water flows through conduit 240 and past valve seat 244 into lower cavity 216. If the force of the water on cup M exceeds the counteracting force produced by spring 276, and the pressure differential across diaphragm H, staff 250 moves downward so as to move disc washer 258 closer to valve seat 244 and restrict the flow through the valve seat until equilibrium is established. If on the other hand the pressure within cavity 216 falls below the prescribed pressure, as it will when water flows outward of outlet fitting 220 at an accelerating rate, the force on cup M due to spring 276 exceeds the opposing force so that staff 250 is moved upward to increase the flow into cavity 216. Such upward movement is facilitated because the pressure above diaphragm H is reduced coincident with pressure reduction in cavity 216.

The presence of removable partition 246 affords installation and maintenance of staff 250 and its accoutrements even though such accoutrements are relatively complex in that they employ Bellofram seals. It is known that Bellofram seals of the type described herein achieve the sealing function without excessive loading on the reciprocating parts so that smooth operation of the pressure regulating apparatus is achieved. The removability of partition 246 and snap ring D permit convenient access to the structure.

Figure 10:
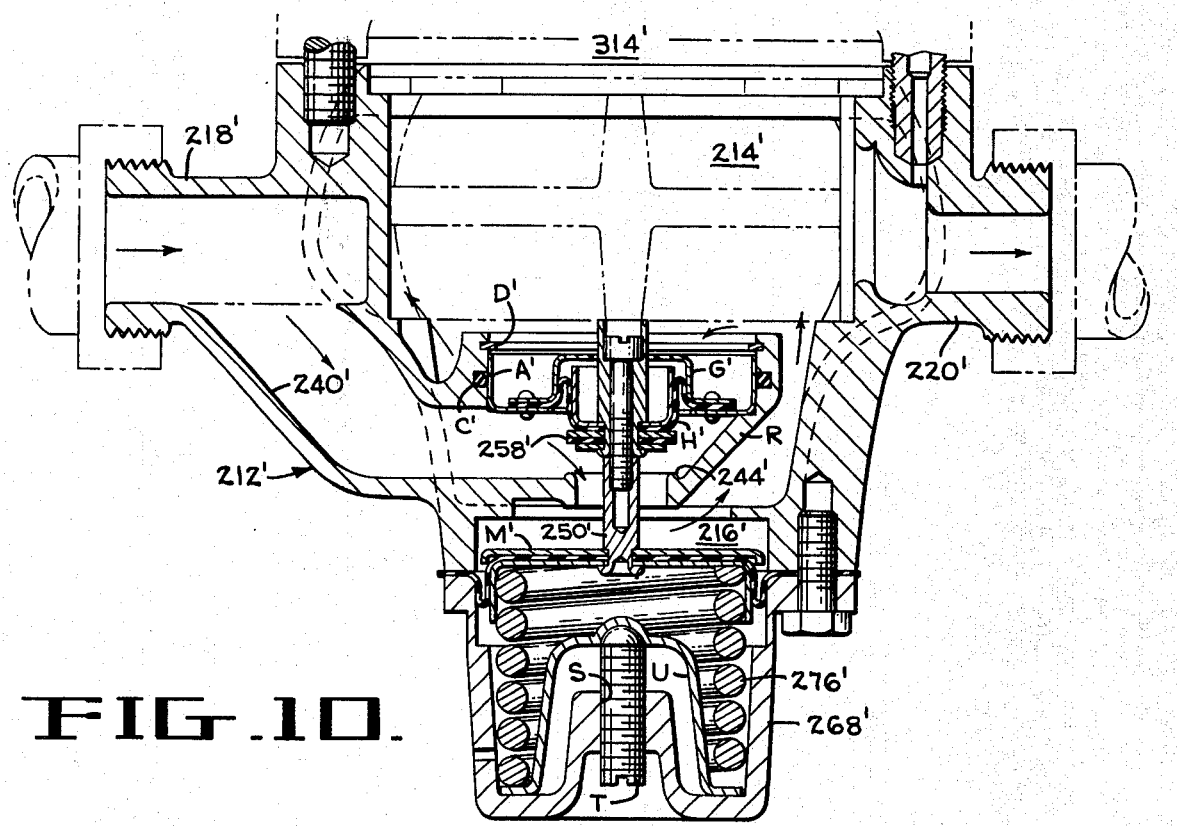
FIG. 10 is a cross-section elevation view of a modified form of the embodiment of FIG. 4.

Referring now to FIG. 10, a housing 212' defines an upper cavity 214' and a lower cavity 216'. As is the case with the embodiment of FIG. 4, the embodiment of FIG. 10 functions to deliver water flowing into inlet fitting 218' to the lower cavity for pressure regulation and thence delivers the water to the metering chamber 214' after which the water is conveyed to outlet fitting 220'. The incoming water, which is at a pressure substantially corresponding to that in the water mains, flows through conduit 240' and then through a central opening circumscribed by a valve seat 244'. Supported for movement toward and away from the valve seat is a washer 258' supported by a structure substantially identical to that described hereinabove in connection with FIG. 9. Because of the similarity of certain parts of FIGS. 9 and 10, identical reference characters with the addition of a prime are employed to designate the similar elements of FIG. 10. There is a cone shaped housing R which at the lower smaller diameter end includes seat 244' and at the upper large diameter end supports a Bellofram seal that includes a cup A' maintained in place by a snap ring D' and sealed by an O-ring C'. The relatively high pressure water is confined interior of the cone shaped housing R so that water at a regulated pressure in cavity 216' flows upward into metering cavity 214' throughout a substantial peripheral extent of the cone shaped housing. Because the pressure on the upper surface of the upper Bellofram seal in FIG. 10 is at relatively low pressure, a partition corresponding to partition 246 in FIG. 9 is not necessary. Accordingly, the parts of the Bellofram seal including cup A', hat G' and diaphragm H' form a partition between the high pressure and low pressure sides of the valve and between cavities 214' and 216'. Such partition is removable by removing water meter 314' and snap ring D', whereby the advantages of the invention are afforded. Because the structure of FIG. 10 is otherwise identical, no further description of the parts is necessary except that cap 268' can be formed with a threaded opening S in coaxial alignment with staff 250' to accommodate a screw T which affords through a flanged cup U adjustability of the force applied by spring 276' on cup M'.

The embodiment of FIG. 10, as is the case with the embodiment of FIG. 9, provides a differential across the upper Bellofram seal which aids the force applied by spring 276' so as to permit enlargement of valve seat 244' without necessitating enlargement of the parts of the device. Accordingly, the invention accommodates Bellofram seals and their attendant advantages of smooth, long lasting operation.

Thus, it will be seen that the present invention provides a combined water meter and pressure regulator within a common housing that can be installed in replacement of conventional water meters without significant modification of the associated piping. The housing of a water meter/pressure regulator according to the present invention is such that the parts can be removed and/or disassembled for inspection, maintenance and repair. Moreover, because the invention has one or more high pressure safety devices, it will not jeopardize house piping and/or fixtures secured thereto should excessive high pressure occur.

Although several embodiments and modifications of the invention have been shown and described, it will be obvious that other adaptations and modifications can be made without departing from the true spirit and scope of the invention.

What is claimed is:

1. Combined water meter and pressure regulator apparatus comprising a fluid impervious housing having upper and lower cavities, a removable partition disposed in said housing and defining a boundary between said cavities, said housing having an opening communicating with said upper cavity, said opening being in alignment with said partition and sized to permit removal of said partition so as to afford access to said lower cavity through said opening, said opening being adapted to receive a water meter measuring chamber therein, said lower cavity having an inlet, an outlet and means for regulating the pressure in said outlet, input and output fittings on said housing, and means within said housing for communicating water from said input fitting to said output fitting through said upper and lower cavities in sequence so that flow from said output fitting is metered and is at a predetermined pressure.

2. Apparatus, according to claim 1, wherein said input and output fittings are diametrically disposed and said pressure regulating means comprises a valve seat circumscribing said inlet, a valve cooperable with said seat to control flow through said inlet, means for constraining said valve for reciprocable movement toward and away from said seat, and means for biasing said valve toward said seat in proportion to water pressure in said lower cavity.

3. Apparatus, according to claim 2, wherein said valve is disposed in a plane substantially parallel to said partition and wherein said constraining means includes guide means rigid with said partition and depending into said lower cavity.

4. Apparatus, according to claim 3, wherein said valve biasing means comprises a portion of said housing opposite said partition defining an aperture, said aperture communicating with said lower cavity, a flexible, fluid impervious diaphragm spanning said aperture, means interior of said lower cavity for linking said diaphragm to said valve and means exterior of said lower cavity and operatively engaged with said diaphragm for resiliently urging said valve away from said seat, so that water pressure on the interior surface of said diaphragm produces a force that opposes said resilient urging means.

5. Apparatus, according to claim 1, including means extending into said lower cavity having an impervious wall defining a conduit terminating interiorly of said lower cavity at said inlet, check valve means transpiercing said wall for affording flow from said lower cavity to said conduit in response to existence of pressure in said lower cavity in excess of a preselected pressure, said preselected pressure established by said regulating means.

6. Apparatus, according to claim 1, including means defining a passage from said output fitting to an orifice in the exterior surface of said housing and pressure relief means disposed in said orifice for discharging water exterior of said housing in response to pressure in said output fitting in excess of a preselected pressure.

7. Apparatus, according to claim 6, wherein said housing defines in the margin circumscribing said opening and having a plurality of threaded holes for receiving correspondingly threaded fasteners for retaining a water meter movement in said opening, wherein said passage orifice is disposed in one of said holes, and wherein said pressure relief means comprises an elongate stud having an external thread engagable with the threads in one of said holes, said stud defining a central bore communicating with said orifice, means disposed in said bore for selectively arresting flow through said bore, and means for resiliently biasing said arresting means to a flow arresting position, said biasing means being arranged to release said arresting means at a preselected excessive pressure in said output fitting.

8. Apparatus, according to claim 7, wherein said stud has sufficient length to project above the surface of said housing so as to define a projecting portion, said projecting portion being threaded, there being an interiorly threaded nut engaged with the threads on said projecting portion for retaining a water meter movement in said opening.

9. Apparatus, according to claim 1, wherein said communicating means is arranged so that water entering said input fitting is communicated first to said lower cavity through said inlet, and further comprising screening means including a portion of said partition defining a perforated region between said lower cavity to said upper cavity for excluding solid particulates from said upper cavity.

10. Combined water meter and pressure regulator apparatus comprising: a fluid impervious housing having a pair of interior cavities; inlet and outlet fittings opening through said housing; a removable partition disposed in said housing and defining a boundary between said cavities; a water meter measuring chamber received in one of said cavities; means within said housing for communicating water through said cavities in sequence from said inlet fitting to said outlet fitting; and, means within the other of said cavities for regulating the pressure at the outlet fitting, said means comprising:
  a. an inlet conduit in fluid communication with the inlet fitting and opening into said other cavity through a valve seat disposed in spaced parallel relationship to the partition;
  b. a valve cooperable with the valve seat and reciprocable relative thereto to restrict flow from the inlet conduit through the valve seat;
  c. a guide carried by the partition and depending into said other cavity and into slidable engagement with the valve to constrain the valve for reciprocable movement toward and away from the valve seat; and,
  d. means for biasing the valve toward the valve seat in proportion to water pressure in said other cavity.

11. Combined water meter and pressure regulator apparatus comprising a fluid impervious housing having two interior cavities, inlet and outlet fittings opening through said housing for respectively admitting water thereinto and discharging water therefrom, a removable partition disposed in said housing between said cavities, a water meter measuring chamber received in one of said cavities, means within said housing for communicating water through said cavities in sequence from said inlet fitting to said outlet fitting, means within the other of said cavities for regulating the pressure of water flow therethrough.

12. Combined water meter and pressure regulator apparatus, according to claim 11, wherein said partition is a rigid member, there being means for removably retaining said rigid member in said housing between said cavities.

13. Combined water meter and pressure regulator apparatus, in accordance with claim 11, wherein said partition is a flexible member, there being means for removably retaining said flexible member in said housing between said cavities.

14. Combined water meter and pressure regulator apparatus, in accordance with claim 13, wherein said retaining means comprises a portion of said housing defining an annular groove adjacent said partition and a snap ring removably disposed in said annular groove.

* * * * *